Figure 1:
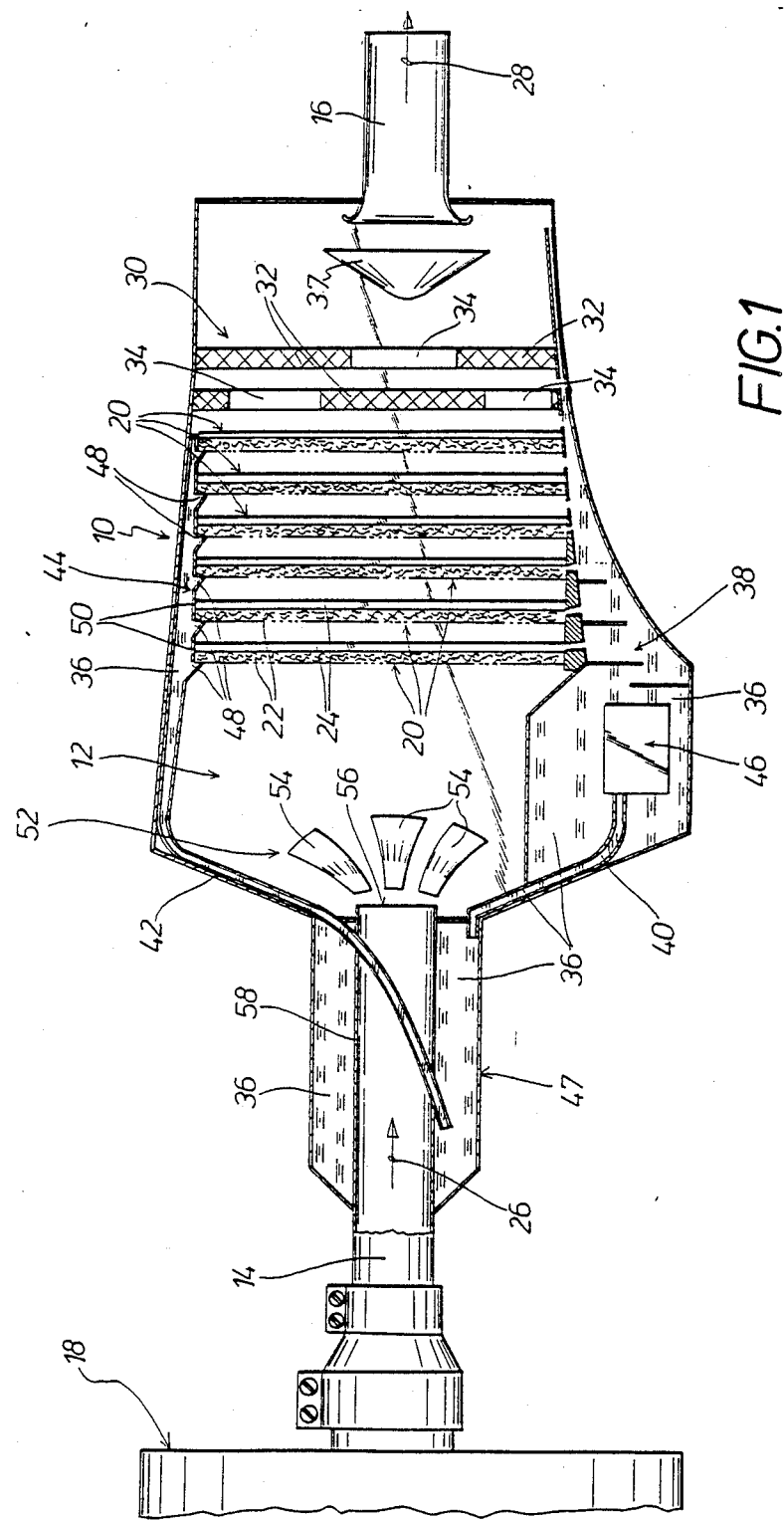

United States Patent [19]

Simmerlein-Erlbacher

[11] Patent Number: 4,938,787
[45] Date of Patent: Jul. 3, 1990

[54] FILTER DEVICE AND FILTER APPARATUS COMPRISING SUCH FILTER DEVICES

[76] Inventor: Ewald-Wilhelm Simmerlein-Erlbacher, Langer Berg 2, D-8570 Pegnitz, Fed. Rep. of Germany

[21] Appl. No.: 353,649
[22] PCT Filed: Oct. 29, 1987
[86] PCT No.: PCT/DE87/00489
§ 371 Date: Apr. 24, 1989
§ 102(e) Date: Apr. 24, 1989
[87] PCT Pub. No.: WO88/03049
PCT Pub. Date: May 5, 1988

[30] Foreign Application Priority Data

Oct. 31, 1986 [DE] Fed. Rep. of Germany ....... 3617428
Apr. 3, 1987 [DE] Fed. Rep. of Germany ....... 3711294

[51] Int. Cl.$^5$ .............................................. B01D 47/12
[52] U.S. Cl. ..................... 55/233; 55/257.3; 55/94
[58] Field of Search ............ 55/89, 90, 94, 222, 55/223, 233, 257.3

[56] References Cited

U.S. PATENT DOCUMENTS

| | | | |
|---|---|---|---|
| 3,672,126 | 6/1972 | Goettle | 55/233 X |
| 3,708,958 | 1/1973 | Duty et al. | 55/89 |
| 3,782,074 | 1/1974 | Gardenier | 55/94 X |
| 3,812,657 | 5/1974 | Lampinen | 55/223 |
| 3,907,523 | 9/1975 | Melin | 55/94 X |
| 4,049,399 | 9/1977 | Teller | 55/223 X |
| 4,615,173 | 10/1986 | Usui et al. | 55/DIG. 30 X |

Primary Examiner—Charles Hart
Attorney, Agent, or Firm—Elliot M. Olstein; John G. Gilfillan, II; Raymond J. Lillie

[57] ABSTRACT

Described as a filter device for filtering particles out of a gaseous fluid, having a substrate (22) and a filter layer provided on the substrate (22). The filter layer is a filter liquid (36) which wets the substrate (22). At least one such filter device (20) is arranged in a housing (12) to provide a filter apparatus (10). The housing (12) has an inlet opening (14) and an outlet opening (16) for the fluid to be filtered. In order for the gas-pervious substrate (22) of the at least one filter device (20) of the filter apparatus (10) to be well wetted with the filter liquid (36), provided in the housing (12) is a watering means (44) which is in fluid communication with the filter devices (20) and which is also in fluid communication with a collecting chamber (38) for the filter liquid (36). A pump (47) serves for circulating the filter liquid (36) between the collecting chamber (38) and the watering means (44) (FIG. 1).

16 Claims, 3 Drawing Sheets

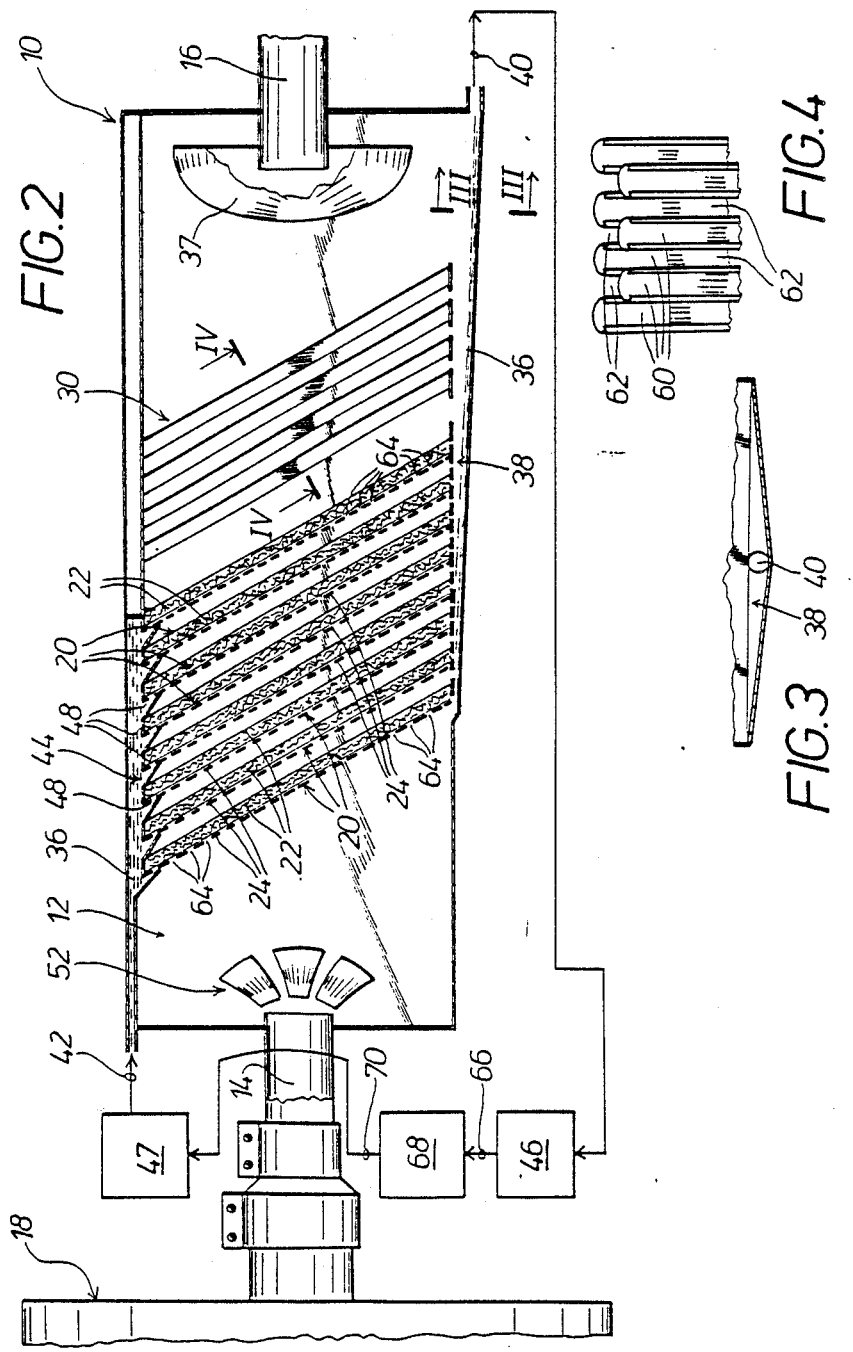

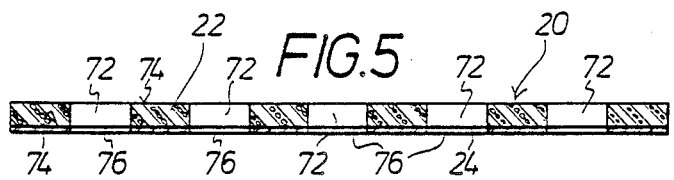
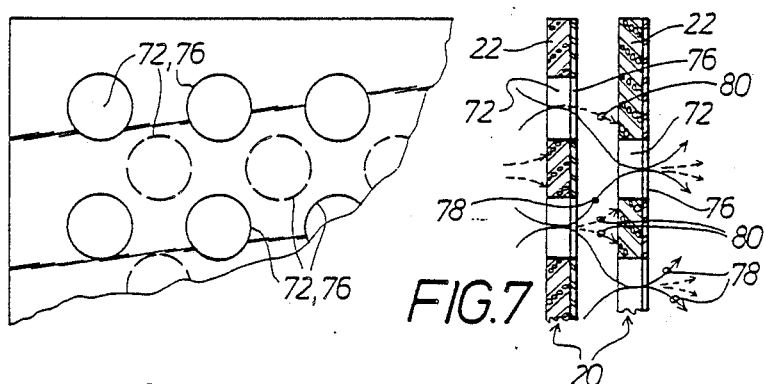
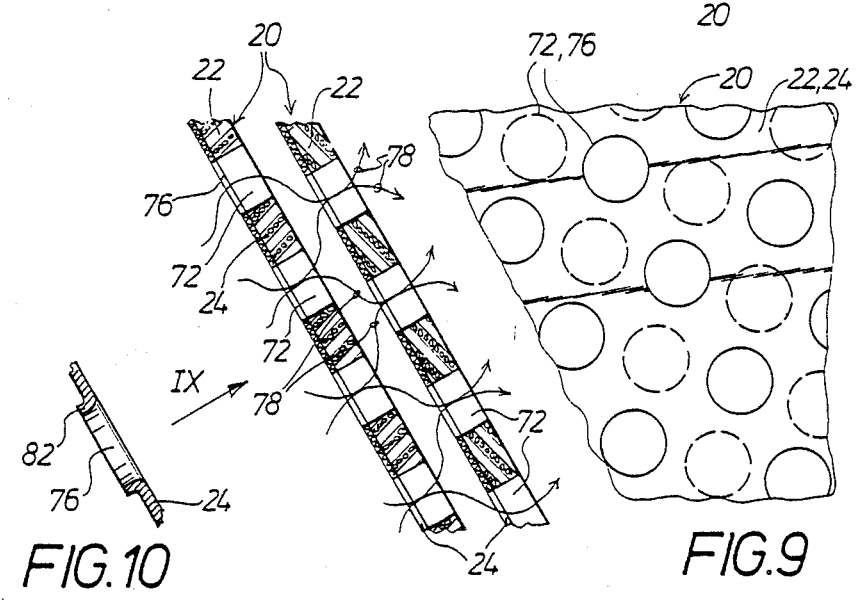

FILTER DEVICE AND FILTER APPARATUS COMPRISING SUCH FILTER DEVICES

The invention relates to a filter device for filtering noxious, dust and other foreign particles out of a gaseous fluid, comprising a substrate and a filter layer disposed on the substrate, and also a filter apparatus comprising such filter devices.

In closed spaces, people in such spaces frequently suffer from irritation and annoyance by virtue of the fact that noxious, dust and other foreign particles are introduced into such spaces through the air inlet arrangement. That applies for example in regard to rooms and areas in department stores, hotels, offices and the like. The admission of air to such rooms is for example by way of ventilation shafts which may be provided with a filter device in the form of mats or meshes for filtering out noxious, dust and other foreign particles. Corresponding filter devices are also used for motor vehicles in order to keep the passenger compartment more or less free of noxious particles or dust particles.

In the known filter devices the flow resistance through the filter device is inversely proportionally dependent on the porosity of the substrate. That means that a large mean mesh or pore diameter in the substrate provides a low flow resistance and vice-versa. If very small particles are to be filtered out by means of such a filter device, it is then necessary for the mean mesh or pore size to be correspondingly small. That however gives rise to a relatively high flow resistance through the filter device. A further disadvantage of such filter devices is that they can become clogged, by the deposit of the filtered-out particles, after just a relatively short period of use, so that they become useless.

The present invention is therefore based on the object of providing a filter device and a filter apparatus comprising such filter devices, with which noxious, dust or other foreign particles can be retained and thus filtered out of a gaseous fluid flowing through the filter device or the filter apparatus, by a physical procedure, that is to say by virtue of adhesion forces at the at least one filter device, wherein the flow resistance through the filter device or apparatus remains comparatively low and the physical filter action is maintained even after a relatively long period of operation of the filter device or apparatus.

According to the invention that object is attained in that the filter layer is a filter liquid which wets the substrate. Because the filter liquid wets the surface of the substrate, it is possible for the gaseous fluid to flow past the surface of the substrate which is wetted with the filter liquid, with a low level of flow resistance, and at the same time for the noxious, dust or other foreign particles entrained with the gaseous fluid to remain clinging to the filter liquid by virtue of the adhesion forces which are operative between the particles and the filter liquid. That provides a filter device with a comparatively low level of flow resistance and a relatively good filter action. A further considerable advantage of the filter device according to the invention is that the danger of clogging of the substrate as a result of the deposit of the noxious, dust or other foreign particles is extremely low and the period of use of the filter device according to the invention is relatively long. Therefore the filter device of the invention is suitable not only for rooms in hotels, department stores and the like but in particular it is also suitable for use in land, air or water-borne vehicles.

In the filter device according to the invention the filter layer comprises glycerine and/or glycol as an essential component. Glycerine is a trivalent alcohol which under normal conditions occurs as a colourless syrupy liquid with a boiling point of 290° C. The melting point of glycerine is 18° C. Under normal conditions glycerine oxidizes only very slowly, wherein both the primary and the secondary hydroxyl groups are attacked, with the formation of glycerine aldehyde. Glycerine is generally unreactive under normal conditions and is advantageously totally non-toxic. As the boiling point is relatively high, it does not evaporate at normal temperatures and is therefore available in liquid form over a very long period of time. It is also possible to use glycol instead of glycerine or mixed with glycerine. It will be appreciated that it is also possible to use liquids similar to glycerine and/or glycol. Additives of surface active agents and/or additives of grease-dissolving agents can also be added to the glycerine and/or glycol. Likewise additives which are suitable for temperature stabilization purposes or for increasing the temperature resistance of the filter liquid can also be added thereto. It is also possible to add scenting agents to the filter liquid.

The filter liquid may include $SiO_2$ and/or $Al_2O_3$. The mixing ratio of those oxides, in the dry condition, is preferably 84% $SiO_2$ and 16% $Al_2O_3$. It will be appreciated that other ratios are also possible. The ratio of filter liquid to $SiO_2$ and/or $Al_2O_3$ can be between 100:1 and 1:1. The viscosity of the filter liquid can be adjusted by suitable selection of that ratio. It is also possible for the filter liquid to include catalytically active metal oxides.

A large proportion of the sulphur dioxide, nitrogen dioxide and other gases in the exhaust gas of an internal combustion engine is bound to the soot in the exhaust gas. That bound gas component is filtered out by the particle filtration effect which takes place in the filter device or filter apparatus according to the invention. Independently of the particle filtration effect, carbon monoxide and other gases can be filtered out of the exhaust gas with the filter apparatus or filter device according to the invention.

The filter device according to the invention or the filter apparatus of the invention which uses at least one such filter device can therefore be used in a highly satisfactory manner as an exhaust gas filter in motor vehicles. Another advantage in the filter apparatus of the invention lies in its improvement in sound damping when such a filter apparatus is arranged downstream of the terminal or rear muffler of a motor vehicle.

The substrate for the filter layer of the filter device according to the invention may be a gas-pervious body of a plate-like configuration. That may involve a foam material body which is saturated or impregnated with the liquid forming the filter layer. In that arrangement the foam body is of a mean pore size such that the flow resistance for the gaseous fluid which flows through the filter device is relatively low. On the other hand, impregnation or saturation of the foam body with the liquid forming the filter layer in such a way that the foam body is covered with a layer of liquid at its entire surface, that is to say at its inner and outer surfaces, provides a very good physical filtering action in respect of the noxious, dust and other foreign particles which are to be found in the gaseous fluid and which are transported with the gaseous fluid through the foam substrate, so that the proportion of such particles at the discharge side of the filter device is substantially less than on the upstream side of the substrate, that is to say, on the entry side of the gaseous fluid.

As a gas-pervious substrate comprising a foam body is not very inherently stable, it has been found advantageous for a stiffening element which permits the gaseous fluid to pass therethrough to be associated with the substrate. The stiffening element may be for example a coarse-mesh wire gauze which is provided on at least one main surface of the substrate. It will be appreciated that it is also possible for the stiffening element to be provided on both sides of the substrate or to be embedded between two substrates.

If a substrate comprising a foam body is used in the filter device of the invention, it has been found to be advantageous for the foam body to have through holes which extend from one main surface to the oppositely disposed main surface of the foam body and for the stiffening element possibly to be provided with holes which correspond to the through holes in the foam body and which are aligned therewith. The fact that the foam body is provided with through holes considerably reduces the flow resistance through the foam substrate because the main part of the flow of the gaseous fluid is through those through holes. In such a filter device the foam body itself serves primarily for storage of the filter liquid. In such a filter device the physical filtration effect is produced by virtue of the fact that the gaseous fluid can flow through the through holes, but the particles which are transported therewith, by virtue of their relatively large mass and thus as a result of their relatively high level of inertia, are retained at the filter liquid and thus at the substrate because they cannot pass along the flow paths which have a small radius of curvature, through the through holes, like the gaseous fluid. Therefore, to produce a good filter action, it is advantageous for the gaseous fluid which is charged with particles to flow in a condition of maximum turbulence, upstream of the filter device. The stiffening element of the above-described kind may be for example cardboard, a layer of plastic material or a thin metal sheet which is provided with through holes corresponding to the through holes in the foam substrate, in respect of size and distribution. The stiffening element is provided to hold even a relatively thin foam substrate in shape. For example the foam substrate may be in the form of a plate or disc and may be of a thickness of the order of magnitude of 5 mm.

In the filter device according to the invention the gas-pervious plate-like substrate may also be a lattice mesh or a foam ceramic. The only important consideration is that the substrate can be well wetted with the filter liquid on all sides. A foam ceramic has the further advantage that it also has good inherent stability, even when the substrate is of thin gauge. A foam ceramic substrate of a thickness of the order of magnitude of 5 mm and with a mean pore diameter of between 1 mm and 4 mm, while providing a very low substrate weight, has a low level of flow resistance and a large specific surface area, that is to say a large surface area which is wetted with filter liquid, and thus very good filtration properties for filtering out noxious particles, dust particles and other foreign particles.

In the case of a filter device which is provided with a stiffening element with through holes therein, as described hereinbefore, it has been found advantageous for the holes of the stiffening element to be provided with a flanged or beaded edge in order to produce turbulence in the gaseous fluid upstream of the filter device and thus produce a turbulent flow, by means of which physical filtration of the particles is improved, as described above.

The filter apparatus according to the invention which comprises a number of filter devices of the above-described kind is characterised in that a plurality of substrates are arranged in a housing having an inlet opening and an outlet opening, transversely with respect to the direction of flow of the fluid to be filtered, in succession and at a spacing from each other. In such a filter apparatus, at least one activated carbon filter may be provided in the housing transversely with respect to the direction of flow of the fluid to be filtered, and spaced from the substrates having the filter liquid. The activated carbon filter may comprise for example a substrate consisting of a gas-pervious foam body, the surface of which is coated or impregnated with a granular material of activated carbon powder or with fibrous activated carbon. Such an activated carbon filter permits chemical adsorption of gaseous noxious substances. Such an activated carbon filter can also be used in known manner as an odour filter. By virtue of the filter apparatus comprising a number of filter devices, the substrates of which are arranged transversely with respect to the direction of flow of the fluid to be filtered, in succession and at a spacing from each other, the arrangement provides a stage filter with a good filter action for noxious and dust particles.

In the case of the filter devices having substrates provided with holes, in a filter apparatus according to the invention the individual substrates may be arranged in succession and at a spacing from each other in the flow direction in such a way that the holes of adjacent substrates are preferably displaced relative to each other. By virtue of the displaced arrangement of the holes of successively adjacent substrates, the fluid which flows through the filter apparatus is diverted in a meander-like configuration between the substrates, wherein the gaseous fluid can flow without difficulty and virtually without flow resistance through the mutually displaced holes, whereas the noxious, dust or other particles which are carried into the filter apparatus with the gaseous fluid, as a result of their mass inertia, remain clinging to one of the substrates or to the filter liquid which wets the substrate. That therefore provides a filter apparatus which has good filtration properties without the flow resistance being adversely affected by the filtration properties. So that the successively arranged and spaced-apart substrates can be wetted with a fresh filter liquid during operation of the filter apparatus, it has been found advantageous that, in the filter apparatus according to the invention, a collecting chamber for the filter liquid is provided in the housing beneath the substrates and a watering or sprinkling means for the substrates is disposed in the housing above the substrates, wherein the watering or sprinkling means is communicated with the collecting chamber by means of a conduit which has a pump for circulating the filter liquid from the collecting chamber to the watering or sprinkling means. As the filter liquid which accumulates in the collecting chamber beneath the substrates contains the noxious, dust or other foreign particles which are filtered out of the gaseous fluid to be filtered, it is advantageous for the conduit between the collecting chamber and the watering or sprinkling means to include a regeneration means with which the particles are separated out of the filter liquid.

A heat exchanger may be provided in the flow path of the filter liquid between the collecting chamber and the watering or sprinkling means. The heat exchanger may be for example a heater for heating up the filter liquid quickly from a cold operating condition to such an extent that it is of sufficient viscosity to satisfactorily wet the at least one substrate of the filter device or the filter apparatus. The heat exchanger in the filter liquid flow path between the collecting chamber and the watering or sprinkling means however may also be a cooling means, for cooling down the filter liquid to such an extent that it does not accidentally begin to boil. A heat exchanger in the form of a cooling means is particularly useful when the filter apparatus according to the invention is used in the exhaust system of a vehicle because for example in motor vehicles the exhaust gas can reach temperatures which are above the boiling point of the filter liquid used in the filter apparatus according to the invention. In order nonetheless to prevent the filter liquid from evaporating, which would at least considerably reduce the filter properties of the filter apparatus, it is advantageous to provide a heat exchanger in the form of a cooling means.

A turbulence-producing means for the fluid to be filtered may be provided downstream of the inlet opening in the housing of the filter apparatus according to the invention. The turbulence-producing means may comprise swirl blades which are arranged at stationary locations or a movable means, for example in the form of a fan. As already stated hereinbefore, the filter action of the filter apparatus is improved by virtue of a turbulent flow in respect of the gaseous fluid to be filtered because the particles to be filtered, as a result of their inertia, then do not follow the path of the gaseous, virtually inertia-less fluid, but, as a result of their mass inertia, are caused to encounter the at least one substrate and are retained at the filter liquid which wets the substrate. Accordingly the turbulence-producing means can further improve the filter action of the filter apparatus according to the invention, in a simple fashion.

A catch means for the droplets of the filter liquid which are entrained with the fluid may be provided in the housing of the filter apparatus downstream of the last filter means and at a spacing therefrom, upstream of the outlet opening. The catch means therefore retain in the housing the filter liquid droplets which unintentionally leave the last filter device. In that connection the catch means is of a such a configuration that it only imperceptibly increases the flow resistance for flow of the gaseous fluid through the filter apparatus. The catch means may be of a construction comprising one or more layers. A single-layer catch means is for example in the form of a lattice mesh of suitable thickness. As a single-layer catch means does not certainly ensure that no droplets of the filter liquid unintentionally pass through the catch means, it has been found advantageous for the catch means to comprise a plurality of layers which are arranged transversely with respect to the direction of flow of the gaseous fluid in succession and at a spacing from each other. The layers of the catch means may each comprise a wire mesh or gauze. The layers of the catch means, like the above-described substrates of the filter devices of the filter apparatus according to the invention, may be flat-surfaced structures which are provided with regularly distributed holes, wherein the holes of layers which are arranged in successive adjacent relationship are displaced relative to each other in such a way that they do not overlap each other. By virtue of such a design configuration for the catch means, the gaseous fluid also flows through the individual layers of the catch means along meander-like paths, whereby the few droplets of filter liquid which are also entrained with the gaseous fluid are retained at the individual layers of the catch means.

It has been found particularly advantageous for the catch means to have a plurality of layers comprising sheet-like elements, wherein the sheet-like elements of a layer are spaced from each other to form gaps and the sheet-like elements of successively adjacent layers are displaced relative to each other in such a way that the gaps of one layer are covered over by sheet-like elements of the adjacent layer. That provides for total overlapping of the sheet-like elements of one layer with the gaps of an adjacent layer, whereby the passage for filter liquid droplets to pass through is negligibly small. The sheet-like elements of the last-mentioned filter apparatus are preferably of a channel-like configuration, wherein the concave inward side of the channel-like sheet-like elements is towards the direction of flow of the gaseous fluid. The channel-like configuration of the sheet-like elements provides that the catch means has good collecting qualities. It will be appreciated that, in the case of a simpler configuration of the filter apparatus according to the invention, it would also be possible for the sheet-like elements to be simply of a flat configuration, although such a flat configuration for the sheet-like elements gives rise to the risk that droplets of filter liquid may be reflected at such elements and passed through the catch means. In order to prevent that from happening, using simple means, it is advantageous for the sheet-like elements to be of a channel-like configuration.

So that the remaining filter liquid droplets which possibly pass through the catch device do not issue through the outlet opening of the filter apparatus, an impingement cap is provided in the housing of the filter apparatus preferably between the catch means and the outlet opening in the vicinity of the outlet opening. The impingement cap is of larger cross-sectional dimensions than the outlet opening so that the cap covers the outlet opening. The cap is at a given spacing from the outlet opening so that the gaseous fluid can flow out of the housing, past the impingement cap, through the outlet opening.

As not only the individual, spaced-apart and successively disposed substrates are wetted with the filter liquid in order to produce an excellent filtration effect with the filter apparatus according to the invention, for noxious, dust and other foreign particles, but also because the catch means can be accidentally wetted with filter liquid droplets which are entrained from the substrate to the catch means by the gaseous fluid or because a few filter liquid droplets can also be passed to the impingement cap disposed upstream of the outlet opening of the filter apparatus, the collecting chamber which is disposed beneath the substrates preferably extends to a position below the catch means and to a position below the impingement cap. By virtue of that arrangement, all the filter liquid which circulates in the filter apparatus can be collected in the collecting chamber, possibly regenerated and circulated in the filter liquid flow path.

In its interior the housing of the filter apparatus may be provided with guide elements for the substrates. By virtue of the filter apparatus being of such a configuration, it is possible for used or damaged substrates possibly to be replaced by fresh substrates. For that purpose the used or damaged substrates are pushed out of the housing along the guide elements and new substrates are then pushed into the housing along the guide elements. The substrates of the filter devices are for example of a quadrangular, polygonal, round, oval or any other configuration in regard to their surface. The substrates may be arranged approximately perpendicularly in the housing of the filter apparatus. In a preferred embodiment of the filter apparatus the substrates and possibly the catch means are arranged in the housing at a position of being inclined from the top front rearwardly and downwardly relative to the vertical and in relation to the direction of flow of the fluid, which is defined by the inlet opening. The angle of inclination of the substrates and possibly the catch means which can preferably comprise a plurality of layers of sheet elements which are arranged in juxtaposed relationship and at a spacing from each other can be adapted to the direction of the resultant of the velocity vector of the gaseous fluid and the flow speed of the filter liquid along the substrates, which is governed by the force of gravity and the positive circulation effect in respect of the filter liquid.

If the filter apparatus according to the invention is provided not only with a number of filter devices having substrates but also with a catch means of the above-described kind, the catch means is preferably oriented approximately parallel to the substrates of the filter devices. The filter apparatus according to the invention has a high filtration efficiency so that it is also suitable for use as an ancillary filter for diesel vehicles. For that purpose the filter apparatus is preferably arranged downstream of the last exhaust member of the exhaust system of the diesel vehicle. The diesel vehicle may be a land vehicle such as a passenger vehicle or a truck, or a boat or ship with a marine diesel unit. The filter apparatus is advantageously also highly suitable for industrial waste gas cleaning, for the removal of soot from a chimney or flue, and for the removal of dust from industrial plants. By virtue of its long service life the filter apparatus according to the invention is also highly suitable for example for circulating air heating installations and the like. The capital investment and operating costs of the filter apparatus and the amount of space that it requires are comparatively low.

Further details, features and advantages will be apparent from the following description of two embodiments of the filter apparatus according to the invention, which are diagrammatically illustrated in the drawings in which:

FIG. 1 is a view in longitudinal section through a first embodiment of the filter apparatus, FIG. 2 is a view in longitudinal section through a second embodiment of the filter apparatus, FIG. 3 is a view in section taken along line III—III in FIG. 2, FIG. 4 is a view in section taken along line IV—IV in FIG. 2 through two of the four layers of the catch means shown in FIG. 2, FIG. 5 is a view in longitudinal section through a filter device with a plate-like foam body provided with through holes, FIG. 6 shows a portion viewed from above of a filter device as shown in FIG. 5, FIG. 7 shows portions of two successively disposed, spaced-apart filter devices as shown in FIG. 5, as are used in a filter apparatus as shown in FIG. 1, FIG. 8 is a view in section through two filter devices as are used in the filter apparatus shown in FIG. 2, FIG. 9 is a view of portions of the filter devices viewing in the direction indicated by the arrow IX in FIG. 8, and FIG. 10 shows a portion of the stiffening element which is illustrated on a larger scale, as is used in a filter device as shown in FIGS. 2, 8 and 9.

FIG. 1 shows a filter apparatus 10 comprising a housing 12 having an inlet opening 14 and an outlet opening 16. The filter apparatus 10 is connected to the terminal muffler of a vehicle. A portion of the terminal muffler is indicated at 18. Filter devices 20 are arranged in succession and at a spacing from each other in the housing 12 of the filter apparatus 10. In the filter apparatus 10 shown in FIG. 1 the filter devices 20 are oriented at least approximately vertically. Each filter device 20 comprises a gas-pervious substrate 22 which may be a foam body, a lattice mesh or a foam ceramic. A stiffening element 24 is associated with each gas-pervious substrate 22. The stiffening element 24 may be in the form of a wire lattice or gauze, a plastic layer provided with holes or a metal sheet provided with holes. The substrate 22 and the stiffening element 24 of a filter device 20 are usually fixedly connected together which not only simplifies stock-keeping and assembly of the filter devices 20 but also simplifies replacement of a used or damaged filter device 20 by a new filter device 20, as and when that becomes necessary. The filter devices 20 are plate-shaped and have a surface which is of a quadrangular, polygonal, round or oval configuration.

Plate-like activated carbon filters may be provided in addition to the filter devices 20. Activated carbon filters of that kind may also have a substrate comprising a foam body.

A catch means 30 is arranged in the housing 12 of the filter apparatus 10 in the direction of flow of the gaseous fluid which is indicated by the arrows 26 and 28, downstream of and at a spacing from the last filter device 20. FIG. 1 diagrammatically shows a two-layer catch device wherein each layer comprises a lattice mesh 32. Each mesh 32 has through holes 34. The spaced-apart mesh layers are arranged in the housing 12 of the filter apparatus 10 in such a way that the through holes 34 of adjacent mesh layers 32 are displaced relative to each other. The displacement of the holes 34 in that arrangement is such that the mesh 32 of one layer completely covers the through holes 34 of the adjacent layer. In that way the gaseous fluid is passed in a meander-like configuration through the mesh layers 32 and the droplets of filter liquid 36 which are accidentally entrained with the gaseous fluid are deflected against the meshes 32, as a result of the mass inertia of the droplets, and are prevented by the meshes 32 from flowing through the catch means 30. In order reliably to ensure that the filter liquid droplets 36 which nonetheless pass through the catch means 30 do not pass into the open air through the outlet opening 16 of the filter apparatus 10, an impingement cap 37 is disposed upstream of the outlet opening 16 of the filter apparatus 10.

In the housing 12, beneath the filter devices 20, the filter apparatus 10 has a collecting chamber 38 for the filter liquid 36, the collecting chamber 38 extending to a position beneath the catch means 30 and beneath the impingement cap 37. The collecting chamber 38 is in fluid communication by way of a conduit 40 and 42 with a watering or sprinkling means 44. A heat exchanger 47 is provided between the conduit 40 and the conduit 42. The heat exchanger shown in FIG. 1 is a device for heating the filter liquid 36. In that arrangement the heat of the gaseous fluid is used to heat the filter liquid 36. In order to return the filter liquid 36 between the collecting chamber 38 and the watering or sprinkling means 44 and from the means 44 by way of the filter devices 20 to the collecting chamber 38, a pump 46 is provided in that filter liquid flow path.

The watering or sprinkling means 44 has openings 48 which extend over the transverse dimension of the gas-pervious substrates 22. The filter liquid 36 flows through the openings 48 to the gas-pervious substrates 22 and totally wets same. Provided in the vicinity of the openings 48 are guide means 50 which serve to guide and retain the filter devices 20.

A turbulence-producing means 52 is arranged downstream of the inlet opening 14 in the interior of the housing 12 of the filter apparatus 10. The flow-producing means comprises deflection vanes 54 which partly overlap the opening 56 of the pipe 58. The gaseous fluid which is indicated by the arrow 26 is caused to assume a turbulent flow configuration by the turbulence-producing means 52 in the housing 12 of the filter apparatus so that the gaseous, particle-charged fluid is passed through the filter devices 20 in a turbulent flow condition. Due to the turbulent flow condition the particles are retained at the filter liquid 36 which wets the gas-pervious substrates 22 while the gaseous fluid flows through the filter devices 20. As, with a sufficiently high flow speed, some droplets of filter liquid 36 are entrained downstream of the last filter device 20, the catch device 30 is provided to catch those droplets and the impingement cap 37 is provided to prevent some droplets from escaping through the outlet opening 16.

In FIG. 1 the pump 46 is shown in the form of an immersion pump which is arranged in the collecting chamber 38. It will be appreciated that it is also possible for the pump 46 to be arranged outside the housing 12. Likewise the heat exchanger 47 may be in the form of a cooler. The use of a cooler or a heater depends on the operating conditions and the filter liquid 36 used in the filter apparatus 10.

FIG. 2 shows a second embodiment of the filter apparatus 10 with a housing 12. The housing has an inlet opening 14 and an outlet opening 16. The filter apparatus 10 is sealingly connected with its inlet opening 14 to a terminal or rearmost muffler 18 of which a portion is shown in FIG. 2. Filter devices 22 are arranged in an inclined position within the housing 12 of the filter apparatus 10. Each filter device 20 comprises a gas-pervious substrate 22 and a stiffening element 24 associated with the substrate. Unlike the filter apparatus 10 in FIG. 1, in the filter apparatus 10 in FIG. 2 the stiffening elements 24 are disposed upstream of the gas-pervious substrate 22.

A catch means 30 is arranged downstream of the filter devices 20 in the housing 12 of the filter apparatus 10. The catch means 30 comprises a plurality of layers of sheet-like elements 60, two layers of sheet-like elements 60 being shown in FIG. 4. The elements 60 are arranged vertically in the housing 12. As can be seen from FIG. 4 the elements 60 of a layer are spaced from each other so that gaps 62 are formed between the individual elements 60. The elements 60 of successively adjacent and spaced-apart layers are laterally displaced relative to each other in such a way that the elements 60 of one layer overlap the gaps 62 of an adjacent layer. In that way the gaseous fluid is passed in a meander-like path between the layers of elements 60 through the gaps 62, while the droplets of filter liquid 36 which possibly leave the last filter device 20, as a result of their mass inertia, do not follow the meander-like flow path of the virtually inertia-less gaseous fluid and are retained by the elements 60. As can be clearly seen from FIG. 4, the elements 60 are of a channel-like configuration, with the concave inside surfaces of the channel-like elements 60 facing towards the flow of the gaseous fluid.

Disposed downstream of the catch means 30 is an impingement cap 37 which is spaced from the outlet opening 16 and which prevents droplets of the filter liquid 36 which possibly still leave the catch means 30 from leaving the filter apparatus 10 through the outlet opening 16.

The substrates 22 of the spaced-apart, mutually parallel filter devices 20 may be gas-pervious foam bodies, lattice meshes or plates of a foam ceramic. The substrates may be with or without holes therethrough. In the embodiment shown in FIG. 2 of the filter apparatus 10, the stiffening elements 24 associated with the substrates 22 are in the form of metal sheets which have holes 64. The filter devices 20 are in fluid communication at the top side of the filter apparatus 10 with a watering or sprinkling means 44 having openings 48. The filter liquid 36 flows through the openings 48 of the watering or sprinkling means 44 to the substrates 22 of the filter device 20 and completely wets same. The excess filter liquid 36 is collected at the underside of the filter devices 20. That purpose is served by a collecting chamber 38 which is disposed under the filter devices 20 and which extends to a position under the catch means 30 and under the impingement cap 37. As can be seen from FIG. 3, the collecting chamber 38 is of a channel-like configuration so as to be able to collect the filter liquid 36 on all sides. The collecting chamber 38 is connected to a heat exchanger 47 by way of a conduit 40. The heat exchanger 47 is in fluid communication by way of a conduit 66 with a supply container 68 for filter liquid 36. The container 68 is connected to a pump 46 by means of a conduit 70. The pump 46 is in fluid communication with the watering or sprinkling means 44 by means of a conduit 42. The conduits 40, 66, 70 and 42 and the heat exchanger 47, the container 68 and the pump 46 are only shown in diagrammatic form by means of arrows or blocks in FIG. 2.

Disposed downstream of the inlet opening 14 in the housing 12 is a turbulence-producing means 52, by means of which the gaseous fluid passing into the filter apparatus 10 is put into a turbulent condition. The turbulent-flow gaseous fluid which is charged with particles passes through the gas-pervious substrates 22 of the filter devices 20, with the particles, as a result of their mass inertia, remaining clinging to the filter liquid 36 which wets the substrate 22, while the gaseous fluid can pass through the filter devices 20, with a low level of resistance to the flow thereof. The droplets of filter liquid 36 which are possibly entrained with the gaseous fluid downstream of the last filter device 20 are caught at the catch means 30. In the event that some droplets of the filter liquid 36 also pass through the catch means 30, the impingement cap 37 is provided upstream of the outlet opening 16 for the filter liquid droplets, to prevent same from flowing through the outlet opening 16.

As already mentioned, the individual gas-pervious substrates 22 of the filter devices 20 which are wetted with the filter liquid 36 may be designed with or without through holes. FIG. 5 shows a filter device 20 in which the gas-pervious substrate 22 is provided with through holes 72 which extend from one main surface 74 of the substrate 22 to the oppositely disposed main surface 74. Connected to the gas-pervious substrate 22 which is for example a foam body is a stiffening element 24 which may comprise cardboard, a plastic layer or a thin metal sheet. The stiffening element 24, like the gas-pervious substrate 22, has through holes 76, the through holes 76 corresponding in respect of size and distribution to the through holes 72 in the gas-pervious substrate 22. The stiffening element 24 of such a filter device 20 serves to stiffen the flexible, gas-pervious substrate so that the filter device 20 can be better handled. The mutually aligned through holes 72 and 76 provide a filter device 20 which has a very low level of flow resistance. As the gaseous, particle-charged fluid is constricted or put into a turbulent condition in the region of the through openings 72, whenever the fluid encounters the filter device 20, the particles which are being transported with the gaseous fluid, by virtue of their greater mass inertia, flow along paths which are of a substantially larger radius of curvature than the gaseous fluid so that the particles are moved into contact with the gas-pervious substrate 22 and are retained by the filter liquid which wets the substrate 22.

In the case of substrates 22 which are provided with through holes 72 or 76, successively adjacent, spaced-apart filter devices 20 are arranged in the filter apparatus 10 (see FIG. 1 or FIG. 2) in such a way that the holes 72, 76 of a filter device 20 are displaced relative to the holes 72, 76 of the adjacent filter device 20. FIG. 7 shows portions of two filter devices 20, clearly showing the displacement of the holes 72, 76 of adjacent spaced-apart filter devices 20. The gaseous fluid which is indicated by the arrows 78 flows in a meander configuration and with a low level of flow resistance through the displaced holes 72, 76 of adjacent filter devices 20. As a result of their mass inertia which is high in comparison with the gaseous fluid, the particles which are being transported by the gaseous fluid as indicated by the arrow 78 describe trajectories of a correspondingly larger radius of curvature. The trajectories of the particles are indicated by the broken-line arrows 80 in FIG. 7. While the gaseous fluid is therefore passed for the major part through the holes 72, 76 with a low level of flow resistance, as indicated by the arrows 78, the particles to be filtered out of the gaseous fluid impinge on the substrates 22 of the filter devices 20, where they are held by the filter liquid which wets the substrates 22. That arrangement therefore provides a filter apparatus with a low flow resistance and a good filtration effect for particles of any kind.

FIG. 8 shows portions of two filter devices 20 as are used in the filter apparatus of FIG. 2. Each filter device 20 comprises a gas-pervious substrate 22 with which a stiffening element 24 is associated. The stiffening element 24 is in the form of a metal sheet and has through holes 76. Aligned with the holes 76 in the stiffening element 24 are through holes 72 which are provided in the gas-pervious substrate 22. The substrate 22 is for example a foam body, a lattice mesh, a foam ceramic or the like. The substrates 22 of the filter devices 20 are wetted, impregnated or saturated with a filter liquid (not shown). Successively arranged, spaced-apart filter devices 20 are arranged in displaced relationship in such a way that the gaseous fluid flows in a meander-like configuration through the filter devices 20, that is to say through the through holes 76, 72 of the successively disposed filter devices 20. The flow of the gaseous fluid is also indicated in FIG. 8 by the arrows 78. The displaced arrangement of the holes 76, 72 of spaced-apart, successively disposed filter devices 20 is shown in FIG. 9.

In order further to improve the turbulence in the gaseous fluid during the flow thereof through the filter devices 20, the holes 76 of the stiffening element 24 are of a configuration having a flanged or beaded edge 82 which faces towards the direction of flow. In order that the particles which are to be filtered out of the gaseous fluid are deposited not only at the wall of the holes 72 in the substrates 22 and at the free rear side of the substrates 22, but also at the front side of the substrates, which faces towards the oncoming flow, the stiffening elements 24 which are disposed at the front sides also have holes, in addition to the through holes 76.

I claim:

1. A filter apparatus for filtering dust or foreign particles from a gas, comprising:

a housing having an inlet opening and an outlet opening; and a plurality of filter devices contained in said housing, said filter devices disposed between said inlet opening and said outlet opening and transversely with respect to the direction of flow of the gas to be filtered, and each of said filter devices disposed in succession and at a spacing from each other, each of said filter devices comprising a substrate upon which is deposited a filter liquid which wets said substrate, each of said substrates including a plurality of holes, wherein the holes of the substrates of adjacent filter devices are displaced relative to each other.

2. The filter apparatus of claim 1 wherein said substrate is a plate-like gas-permeable foam body upon which said filter liquid is deposited.

3. The filter apparatus of claim 2, wherein each of said filter devices further comprises at least one gas-permeable stiffening element adjacent each of said foam bodies.

4. The filter apparatus of claim 3 wherein each of said stiffening elements has a plurality of holes, and the holes of each of said foam bodies are aligned with the holes of the at least one stiffening element adjacent each said foam body.

5. The filter apparatus of claim 1 wherein each of said substrates of each of said filter devices is a plate of lattice mesh.

6. The filter apparatus of claim 1 wherein each of said substrates of each of said filter devices is made of a foam ceramic.

7. The filter apparatus of claim 1 wherein said filter liquid includes at least one of the group consisting of glycerine or a glycol.

8. The filter apparatus of claim 7 wherein said filter liquid further includes at least one of the group consisting of $SiO_2$ and $Al_2O_3$.

9. The filter apparatus of claim 1 and further comprising:

a collecting chamber contained within said housing and disposed below each of said substrates for collecting said filter liquid;

watering means contained within said housing above each of said substrates, said watering means capable of depositing said filter liquid upon each of said substrates;

conduit means connecting said collecting chamber with said watering means; and a pump means for circulating said filter liquid from said collecting chamber through said conduit means to said watering means.

10. The filter apparatus of claim 9 and further comprising a heat exchanger disposed along said conduit means.

11. The filter apparatus of claim 10 and further comprising turbulence-producing means for producing turbulence in said gas, said turbulence-producing means disposed in said housing downstream of said inlet opening.

12. The filter apparatus of claim 1 and further comprising a catch means provided in said housing downstream of the last of said plurality of filter devices and spaced upstream from said outlet opening, said catch means separating droplets of said filter liquid entrained in said gas.

13. The filter apparatus of claim 12 wherein said catch means comprises a plurality of layers, each of said layers comprised of a plurality of sheet-like elements, wherein each of said elements of a layer are spaced from each other to form a plurality of gaps, and the elements of successively adjacent layers are displaced relative to each other such that the gaps formed by one layer of sheet-like elements are aligned with the sheet-like elements of an adjacent layer of sheet-like elements.

14. The filter apparatus of claim 13 wherein each of said sheet-like elements has a convex side and a concave side, and wherein the concave side of each of said sheet-like elements faces toward the direction of flow of the gas.

15. The filter apparatus of claim 12, and further comprising an impingement cap disposed in said housing between said catch means and said outlet opening.

16. The filter apparatus of claim 1 wherein said substrates are disposed in said housing such that said substrates are inclined from said inlet opening rearwardly and downwardly relative to the vertical and in relation to the direction of flow of said gas.

* * * * *